United States Patent [19]
Derrick

[11] Patent Number: 5,350,623
[45] Date of Patent: Sep. 27, 1994

[54] COMPRESSIBLE BLANKET ASSEMBLY

[76] Inventor: Steven L. Derrick, 12275 High Meadow, Dallas, Tex. 75234

[21] Appl. No.: 945,480

[22] Filed: Sep. 21, 1992

[51] Int. Cl.$^5$ .............................................. B32B 7/02
[52] U.S. Cl. ...................................... 428/217; 428/250; 428/492; 428/909; 101/217; 101/375
[58] Field of Search ............... 428/250, 492, 909, 217; 101/217, 375

[56] References Cited
U.S. PATENT DOCUMENTS

| | | |
|---|---|---|
| 3,802,952 | 4/1974 | Gurin et al. ........................ 161/164 |
| 3,819,471 | 6/1974 | Sohnemann ........................ 161/162 |
| 3,881,045 | 4/1975 | Strunk ................................ 428/215 |
| 3,967,042 | 6/1976 | Laskin et al. ....................... 428/422 |
| 3,983,287 | 9/1976 | Goossen et al. .................... 428/241 |
| 4,025,685 | 5/1977 | Haren et al. ........................ 428/304 |
| 4,042,743 | 8/1977 | Larson et al. ....................... 428/300 |
| 4,086,386 | 4/1978 | Gaworowski ....................... 428/307 |
| 4,132,826 | 1/1979 | Dessauer et al. ................... 428/314 |
| 4,178,192 | 12/1979 | Klapproth et al. ................. 428/192 |
| 4,219,595 | 8/1980 | Spöning ............................. 428/40 |
| 4,537,129 | 8/1985 | Heinemann et al. ............... 101/415.1 |
| 4,751,127 | 6/1988 | Pinkston et al. .................... 428/141 |
| 4,770,928 | 9/1988 | Gaworowski et al. ............. 428/284 |
| 4,817,527 | 4/1989 | Wouch et al. ...................... 101/389.1 |

Primary Examiner—George R. Lesmes
Assistant Examiner—C. Raimund

[57] ABSTRACT

A void-free, latex rubber cushion layer is interposed between the blanket cylinder and the base layer of a compressible printing blanket in an offset printing press. The latex cushion layer has a thickness of from 8 to 12 mils, and has a spring modulus which is substantially less than the spring modulus of the compressible layer in the printing blanket. The latex cushion layer will compress slightly, about 1 mil, in response to preloading at typical preload impression pressure. This means that a good quality print may be obtained at a substantially reduced impression pressure level, since it is not necessary to preload the blanket. During a printing operation, the latex cushion layer is under preload compression and applies a back pressure force which assures a quality imprint. The compressible layer of the blanket, which has a greater spring constant, is not compressed at the typical printing pressure setting. However, the compressible layer in the printing blanket is yieldable and will compress by about 3-4 mils when the loading is increased in response to a misfeed situation, for example, when two sheets or two envelopes are fed through simultaneously. This arrangement also permits envelopes and flat sheets to be printed in successive printing runs without buildup modification of the impression cylinder surface.

9 Claims, 2 Drawing Sheets

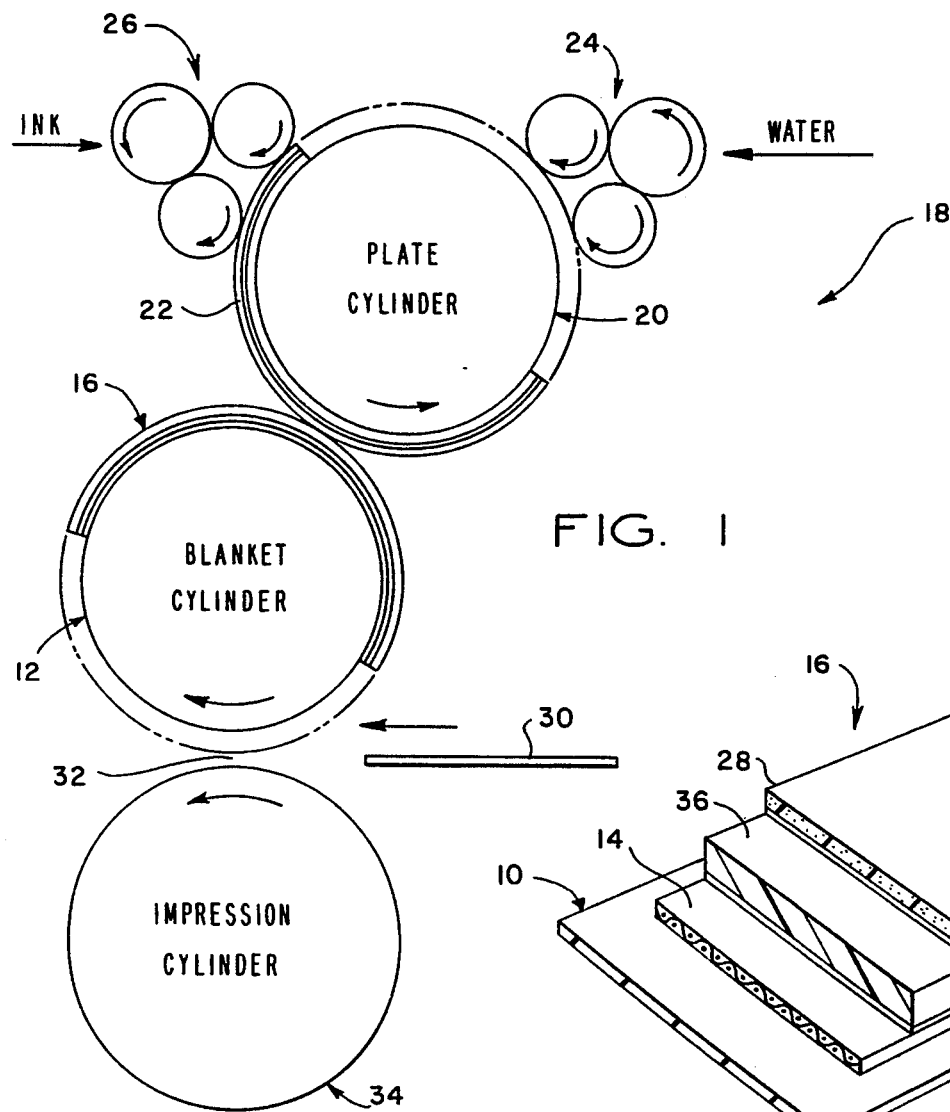
FIG. 1
FIG. 3
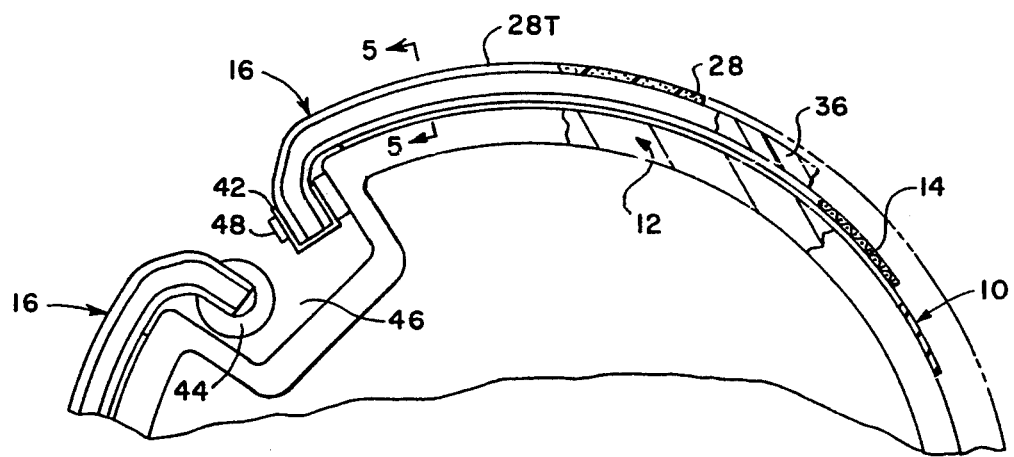
FIG. 2

COMPRESSIBLE BLANKET ASSEMBLY

FIELD OF THE INVENTION

This invention relates generally to offset lithography, and in particular to compressible, offset printing blankets.

BACKGROUND OF THE INVENTION

In offset printing, an image which is to be reproduced is formed on a printing plate which is attached to the surface of a plate cylinder. The image is not printed directly from the plate onto the paper, but is first transferred to an intermediate ink transfer blanket, which is mounted on a blanket cylinder. The blanket transfers (offsets) the image to a sheet of paper which is fed through the nip between an impression cylinder and the blanket cylinder. The offset printing press thus includes three rotatable cylinders, the plate cylinder which carries the printing plate, the blanket cylinder which has an ink receptive surface for receiving the inked image, and the impression cylinder which presses the paper against the blanket so that the inked image is transferred to the paper.

The blanket has an ink transfer surface made of an ink receptive (oleophilic) material. Paper fed between the blanket cylinder and the impression cylinder receives the inked image directly from the blanket to complete the offset printing process. The position of the impression cylinder relative to the blanket cylinder is adjustable so that the printing pressure applied to the sheet may be adjusted to obtain a clean transfer of ink, without crushing or otherwise deforming the blanket.

DESCRIPTION OF THE PRIOR ART

Conventional printing blankets typically include a base layer of durable, flexible material, for example, woven fabrics or reinforced paper, together with one or more intermediate compressible layers, typically of soft rubber, and an outer layer, typically of hard rubber, which is ink receptive. The outer layer has an ink transfer surface made of natural or synthetic rubber which is secured by adhesive to the intermediate compressible layer. The ink transfer surface is finished by calendaring the rubber in successively thin layers until a desired thickness is produced.

The purpose of the printing blanket is to transfer ink from the printing plate to the paper. Conventional printing blankets are carefully designed so that the hard ink transfer surface of the blanket is not damaged either by mechanical contact with the press components or by chemical reaction with the ink. Repeated contacts may cause a certain amount of compression of the blanket which must be within proper limits so that the image may be reproduced during normal press operation without causing permanent deformation of the blanket. Moreover, the blanket must be capable of eventually returning to its original thickness so that it may faithfully reproduce the inked image from the plate cylinder.

During the course of using such a printing blanket in an offset printing run, the blanket may be subjected to damaging compressive forces in response to a misfeed of two or more sheets at the same time, a folded sheet, a glue spot or the like which will permanently deform the blanket and cause a permanent reduction in its thickness or gauge. Most printing blankets now in use include a compressible intermediate layer which is yieldable to accommodate misfeed contact, and has the capability to compress and recover readily, without distortion of the ink transfer surface. There are continuing efforts to improve the compressibility of printing blankets, for example, by the use of sponge rubber, textile fibers, special fabric layers, and cellular resilient polymer layers having discrete microcells.

The loading applied by the impression cylinder against a blanket cylinder which includes an intermediate compressible layer is typically at a level which will impose a constant compression loading on the compressible layer. Preloading of a conventional blanket having an intermediate compressible layer tends to help maintain the evenness of the ink transfer surface during the printing operation by restoring the normal thickness of the blanket after compression at the nip of the press. The ability of the preloaded intermediate compressible layer to 14 recover also will compensate for small surface irregularities which may exist on the surface of the impression cylinder, on the paper item being printed or on the ink transfer surface of the blanket cylinder.

The resiliency and the ability of the compressible intermediate layer to recover gradually diminishes in response to permanent set caused by repeated impression contact. Generally, the loss of resiliency increases in proportion to the pressure applied by the impression cylinder and by the magnitude of deflection caused by the repeated contacts during a press run. Consequently, the press operator must carefully adjust the pressure of the impression cylinder so that a good quality imprint is achieved, while avoiding more pressure than is needed.

During initial makeready, the press operator increases the impression cylinder pressure level until the intermediate compressible layer is loaded sufficiently to apply back pressure, while avoiding an excessive pressure level which would cause a whiteout condition. A whiteout condition occurs when the ink is compressed so forcefully that it is squeezed outside of the imprint area, resulting in an ink layer which is not uniform, yielding a faded, blurred image. Typically, the press operator will increase the pressure applied by the impression cylinder until whiteout occurs, and then reduce the pressure slightly until the whiteout condition is eliminated. A limitation of this technique, however, is that the impression pressure is likely to be set at a level which is greater than the minimum level required for good quality printing. Such excessive impression pressure may cause a permanent set of the blanket during normal press operation. Moreover, the pressure setting procedure is somewhat subjective, and the actual pressure level obtained each time is not repeatable from job to job.

Most compressible blankets are designed for a maximum deflection of from about 3-4 mils for safely accommodating typical misfeed situations. However, the press operator may initially preload the compressible layer of the blanket to as much as 2-3 mils deflection in order to be assured of a good quality imprint. If the blanket cylinder is initially preloaded by a 2-3 mil deflection, it will not have sufficient reserve deflection capability to accommodate a misfeed situation. A misfeed might require as much as 4 mils total deflection to permit it to safely pass without tearing, denting or otherwise deforming the blanket. Consequently, conventional printing blankets are usually damaged beyond repair and must be replaced each time a misfeed event occurs. Even if a misfeed event does not occur, the resiliency and recoverability of the preloaded blanket are continuously being impaired by repeated contact against the printed items, and also by repeated contact against the impression cylinder.

Another problem faced by press operators relates to makeready work required when converting the press from running flat sheets to running folded sheets or envelopes. Typically, to convert the press for an envelope run, the press operator will trip an image from the plate cylinder to the blanket and from the blanket to the impression cylinder. The press operator will then mask off the area of the impression cylinder with tape or a segment of "sticky-back" blanket. The image again is tripped onto the masked surface to obtain image registration. Finally, the press operator performs additional trimming operations so that the envelope balances on the blanket. This process may take from 15–45 minutes, and requires considerable skill. After the impression cylinder makeready has been completed, it is then necessary to adjust the impression pressure so that the blanket cylinder is preloaded properly, as discussed above.

OBJECTS OF THE INVENTION

The principal object of the present invention is to improve the useful life of a conventional printing blanket of the type having a compressible intermediate layer.

A related object of the present invention is to reduce the level of impression pressure required to make a good quality print when a conventional printing blanket of the kind having an intermediate compressible layer is used.

Another object of the present invention is to improve the printing quality obtained when using a conventional compressible printing blanket.

Still another object of the present invention is to improve the deflection response and recoverability of a conventional printing blanket of the kind having an intermediate compressible layer.

Yet another object of the present invention is to provide a method for employing the deflection response and recoverability features of a conventional printing blanket in which preloading of the intermediate compressible layer is substantially eliminated.

SUMMARY OF THE INVENTION

The foregoing objects are achieved according to the present invention in which a void-free, latex rubber cushion layer is interposed between the blanket cylinder and the base layer of a compressible printing blanket in an offset printing press. The latex cushion layer has a spring modulus which is substantially less than the spring modulus of the compressible layer in the printing blanket. The latex cushion layer will compress slightly, about 1 mil, in response to preloading at typical printing pressure. The compressible layer of the blanket, which has a greater spring modulus, is not deformed or deflected at the typical preload impression pressure setting. However, the compressible layer in the printing blanket is yieldable and will deflect by about 3–4 mils when the loading is increased in response to a misfeed situation, for example, when two sheets or two envelopes are fed through simultaneously.

The latex rubber cushion layer is compressed between the external surface of the blanket cylinder and the base layer of the compressible blanket. However, the latex cushion layer is not attached to or otherwise connected to the blanket. According to this arrangement, the compressible blanket effectively floats on the latex cushion, thus permitting radial deflection of the blanket in response to preloading impression pressure, and also permits circumferential displacement of the blanket relative to the cylinder, thereby yielding circumferentially in response to misfeed contact. By yielding circumferentially, the effects of misfeed contact which might cause tearing, denting and the like are prevented.

Operational features and advantages of the present invention will be understood by those skilled in the art upon reading the detailed description which follows with reference to the attached drawings.

BRIEF DESCRIPTION OF THE DRAWINGS

FIG. 1 is a simplified, schematic diagram showing the relative position of principal components of an offset printing press;

FIG. 2 is a sectional view, partially broken away, of the blanket cylinder and blanket which have been modified by the cushion layer of the present invention;

FIG. 3 is a perspective view, partially in section, showing the principal layers of a conventional printing blanket in association with the cushion layer of the present invention;

DETAILED DESCRIPTION OF THE PREFERRED EMBODIMENT

Figure 4:
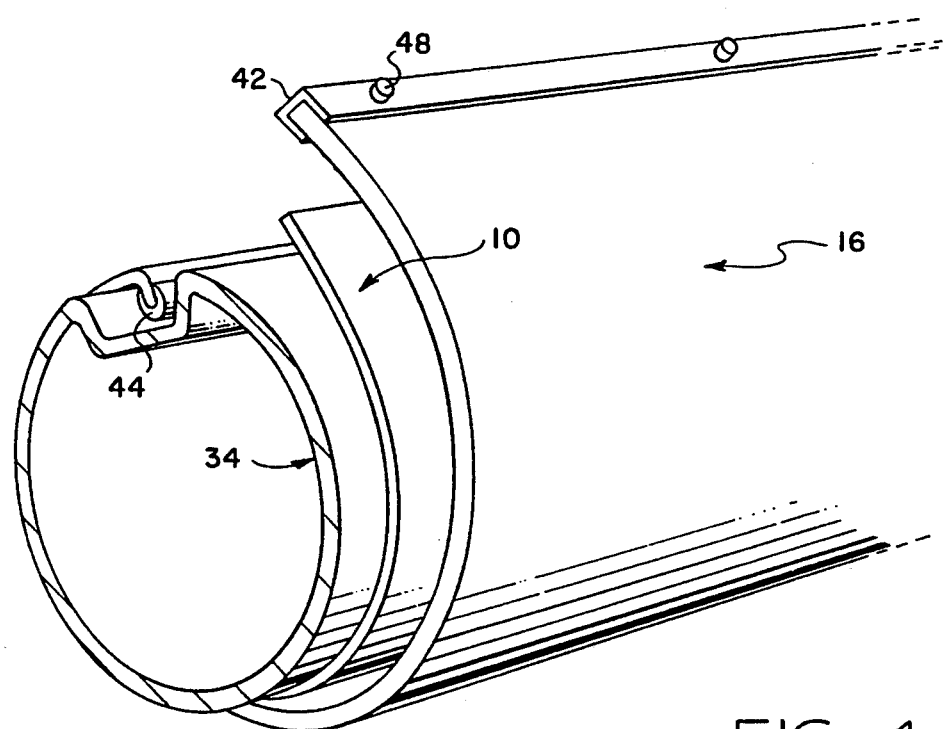
FIG. 4 is a perspective view, partially in section and partially broken away, showing the installation of a conventional printing blanket and the cushion layer of the present invention onto an impression cylinder; and, FIG. 5 is a cross-sectional view, enlarged and partially broken away, taken along the line 5—5 of FIG. 2.

In the description which follows, like parts are indicated throughout the specification and drawings with the same reference numerals, respectively. The drawings are not necessarily to scale and the proportions of certain parts have been exaggerated to better illustrate details of the present invention.

Referring now to FIG. 1, FIG. 2 and FIG. 3, a void-free, latex rubber cushion layer 10 is interposed between the blanket cylinder 12 and the base carrier layer 14 of a compressible printing blanket 16 in an offset printing press 18. The offset printing press 18 is a metal plate (either zinc or aluminum) which has been given a sensitized coating on which an image has been formed by a photographic process. A cluster of moistening rollers 24 applies a thin film of water to the printing plate 22, which then comes into contact with a cluster of inking rollers 26. The ink is rejected by the water holding areas of the printing plate, but is absorbed by the ink receptive surface areas of the image. The blanket cylinder has an ink receptive, transfer layer 28 which absorbs the ink impression and transfers the image to a sheet of paper 30. The sheet of paper 30 is fed through the nip 32 between an impression cylinder 34 and the blanket cylinder 12. As the impression cylinder presses the paper against the blanket cylinder, the ink image is transferred to the paper 30.

That is, the paper sheet 30 is fed between the blanket cylinder 12 and the impression cylinder 34 and receives the inked image directly from the blanket to complete the offset printing process. The position of the impression cylinder 34 relative to the blanket cylinder 12 is adjustable so that the printing pressure applied to the sheet 30 may be adjusted to obtain a clean transfer of ink, without crushing or otherwise deforming the blanket.

The base carrier layer 14 is made of a durable, flexible material, for example, reinforced paper or woven fabric material. The outer layer 28 has an ink transfer surface 28T made of natural or synthetic rubber. The ink transfer surface 28T is ink receptive, and is finished by calendaring the rubber in successively thin layers until the desired thickness is obtained.

To avoid crushing, denting or otherwise deforming the hard printing ink transfer surface 28T, the ink transfer layer 28 is supported by a resilient layer 36 of soft rubber. The base carrier layer 14, the intermediate compressible layer 36 and the hard ink transfer layer 28 are stabilized and secured together by adhesive deposits 38, 40. The cushion layer 10 is not attached to the base carrier layer 14, but merely is sandwiched between the base carrier layer 14 and the external surface of the blanket cylinder 12 as shown in FIG. 2.

Referring now to FIG. 2 and FIG. 4, the ink transfer blanket 16 has a leading end portion which is terminated by a clamp plate 42. The opposite end of the compressible blanket assembly 16 is secured within an elongated slot of a ratchet wheel 44. The cushion 10 and the compressible blanket assembly 16 are assembled onto the blanket cylinder 34 by first attaching the clamp plate 42 onto the blanket cylinder within a channel pocket 46. The clamp plate 42 is secured by threaded fastener bolts 48, and the ratchet wheel 44 is secured by a ratchet clamp (not shown). After the blanket 16 has been secured in place, with the cushion 10 confined between the carrier base 14 and the external surface of the blanket cylinder 12, the ratchet wheel 44 is tightened to secure the blanket in tension about the blanket cylinder.

Figure 5:
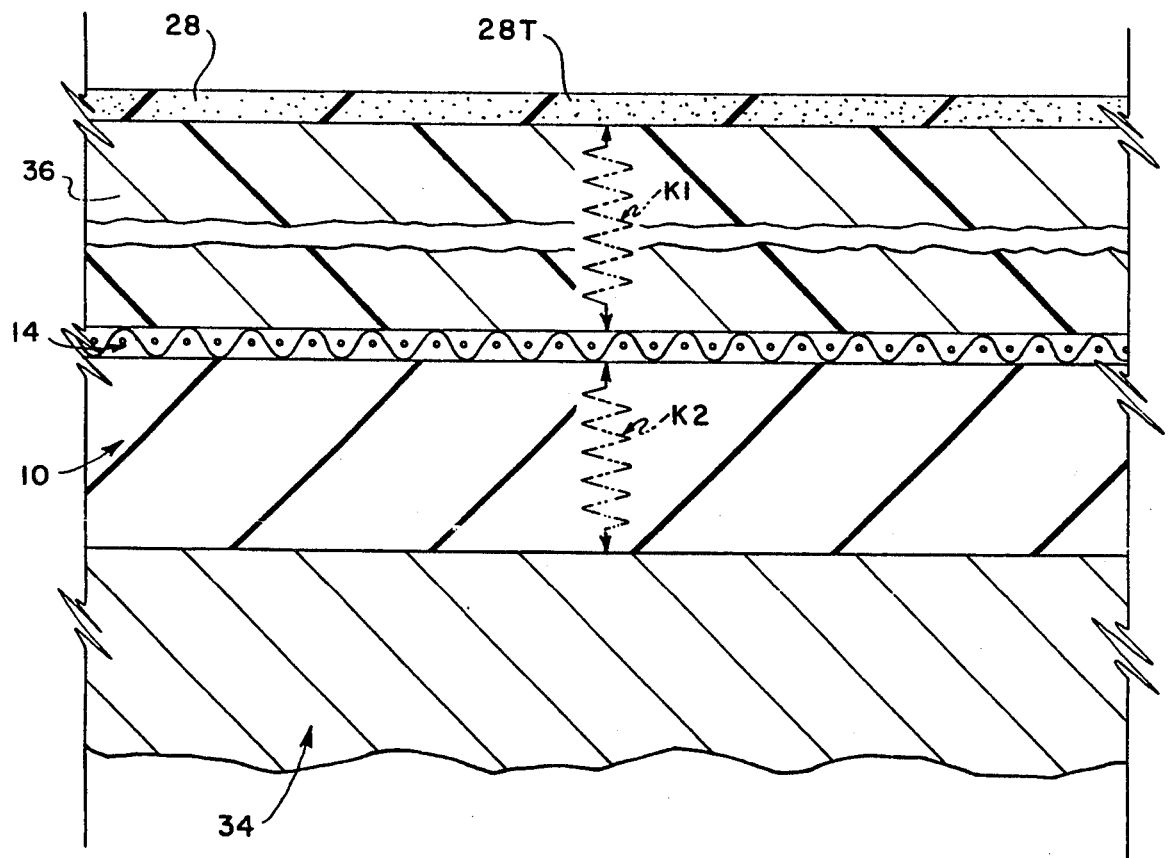

Referring now to FIG. 5, the cushion layer 10 is preferably a sheet of natural latex rubber, chemical name polyisoprene, and has a sheet thickness in the range of from about 0.003 inch to about 0.050 inch. In the exemplary embodiment described herein, the latex sheet thickness is preferably about 0.008 to about 0.012 inch. The natural latex rubber sheet is characterized by a 300 percent modulus at 130 psi measured according to ASTMD 412-68, a tensile strength of 4,000 psi measured according to ASTMD 412-68, an ultimate elongation of 780 percent measured according to ASTMD 412-68, and a Shore A hardness in the range of from about 35 to about 45 durometer measured according to ASTMD 2240-75. Moreover, the natural latex has a bulk weight density of 0.033 pounds per cubic inch, and a base lastomer specific gravity of 0.93. Natural latex rubber sheeting suitable for use in connection with the present invention can be obtained from various sources, including the Hygenic Corporation of Akron, Ohio.

Referring again to FIG. 5, the latex cushion layer 10 has a spring constant K2 which is substantially less than the spring constant K1 of the intermediate compressible layer 36 in the printing blanket. The latex cushion layer 10 has a thickness in the range of from about 0.008 inch to about 0.012 inch, and will deflect slightly, about 1 mil, in response to preloading at typical printing pressures, which may be about 100 psi. At this preload pressure setting, the compressible layer 36 of the printing blanket, which has a greater spring modulus, is not deformed or deflected. However, the compressible layer 36 is yieldable and will deflect by as much as 3–4 mils when the impression loading is increased in response to a misfeed situation, for example, when two sheets or two envelopes are fed through simultaneously, The latex rubber cushion 10 is compressed between the external surface of the blanket cylinder 12 and the base carrier layer 14 of the compressible blanket 16. However, the latex cushion layer 10 is not attached to, secured to or otherwise connected to the base carrier sheet 14. According to this arrangement, the compressible blanket 16 effectively floats on the latex cushion 10, thus permitting radial deflection of the blanket 16 in response to preloading impression pressure, and also permits circumferential displacement of the blanket 16 relative to the blanket cylinder 12, thereby yielding circumferentially in response to misfeed contact. By yielding circumferentially, the effects of misfeed contact which might cause tearing, denting or the like in the ink transfer layer 28 are avoided.

According to this arrangement, the contact of preloading impression pressure is resiliently reacted by the cushion layer 10, thus effectively decoupling the printing blanket 16 with respect to deflection which might otherwise be caused by the preloading impression pressure. By this arrangement, the preloading impression pressure applied by the impression cylinder can be adjusted for a quality imprint substantially without causing deflection within the intermediate blanket layer 36. This effectively extends the useful life of the printing blanket, since it is run substantially without deflection, except in response to a misfeed situation. Additionally, since good imprint can be obtained at lower pressure settings, the service life of the cylinders and their associated bearing components will be extended. A further advantage is that by operating at substantially reduced impression levels, a quality print is obtained without experiencing whiteout or blurring of the image.

An important advantage provided by the cushion layer of the present invention is that the full deflection range of the printing blanket is available for accommodating misfeed contact. That is, since it runs normally substantially without deflection, when a misfeed event occurs, it has its full deflection range available, thus preventing damage to the ink transfer layer. Finally, impression cylinder makeready work is not required when the cushion 10 is utilized. When changing from flat sheet printing to envelope printing, the conversion is carried out simply by adjusting the pressure applied by the impression cylinder to compensate for the increased thickness of the envelopes. It is not necessary to mask the impression cylinder since the full deflection range of the compressible layer in the printing blanket is available to accommodate the increased thickness of the envelopes.

Various modifications of the disclosed exemplary embodiment as well as alternative offset press applications will be suggested to persons skilled in the art by the foregoing specification and illustrations. It is therefore contemplated that the appended claims will cover any such modifications or embodiments that fall within the true scope of the invention.

What is claimed is:

1. A blanket assembly for attachment to the blanket cylinder of an offset printing press comprising, in combination:
   a compressible blanket having a base carrier layer, a compressible intermediate layer and an ink transfer layer; and,
   a cushion layer of compressible material adapted for wraparound assembly onto the blanket cylinder intermediate the base carrier layer of the compressible blanket and the external surface of the blanket cylinder wherein the cushion layer has a spring modulus which is substantially less than the spring modulus of the compressible layer and the cushion layer is not attached to, secured to, or otherwise connected to the base carrier layer whereby the compressible blanket effectively floats on the cushion layer permitting radial deflection of the blanket in response to preloading impression pressure and circumferential displacement of the blanket relative to the cylinder in response to misfeed contact.

2. A blanket assembly as defined in claim 1, wherein said cushion layer comprises a sheet of void-free, latex rubber.

3. A printing blanket assembly for attachment to the blanket cylinder of an offset printing press as defined in claim 1, wherein said cushion layer comprises polyisoprene.

4. A printing blanket assembly for attachment to the blanket cylinder of an offset printing press as defined in claim 1, wherein said cushion layer comprises a sheet of substantially void-free, natural latex rubber having a thickness gauge in the range of from about 0.003 inch to about 0.050 inch.

5. A printing blanket assembly for attachment to the blanket cylinder of an offset printing press as defined in claim 1, wherein said cushion layer comprises a sheet of natural latex rubber having a Shore A hardness in the range of from about 35 to about 45 durometer.

6. A printing blanket assembly for attachment to the blanket cylinder of an offset printing press as defined in claim 1, wherein said cushion layer comprises a sheet of substantially void-free, natural latex rubber having a sheet thickness of about 0.010 inch.

7. An offset printing blanket assembly consisting essentially of a substantially void-free ink transfer layer, compressible rubber layer, a flexible backing sheet and a cushion layer wherein:

the ink transfer layer, compressible rubber layer and flexible backing sheet are firmly adhered together to form a compressible blanket;

the cushion layer has a spring modulus which is substantially less than the spring modulus of the compressible rubber layer and;

the cushion layer is not attached to, secured to, or otherwise connected to the flexible backing sheet whereby the compressible blanket effectively floats on the cushion layer permitting radial deflection of the blanket in response to preloading impression pressure and circumferential displacement of the blanket relative to the cylinder in response to misfeed contact and, under an applied force, the cushion layer has a greater deflection response than the intermediate layer.

8. An offset printing blanket assembly as defined in claim 7, wherein said cushion layer comprises natural latex having a 300 percent modulus at 130 psi measured according to ASTMD 412-68, a tensile strength of 4,000 psi measured according to ASTMD 412-68, an ultimate elongation of 780 percent measured at ASTMD 412-68 and a Shore A hardness of 35-45 duromter, and a sheet thickness gauge in the range of from about 0.003 inch to about 0.050 inch.

9. An offset printing press of the type having a blanket cylinder and a printing blanket attached to the blanket cylinder for transferring an ink image form plate cylinder to a paper item, the improvement comprising a cushion layer of compressible material interpose between said printing blanket and said blanket cylinder wherein the cushion layer has a spring modulus which is substantially less than the spring modulus of the printing blanket and;

the cushion layer is not attached to, secured to, or otherwise connected to the printing blanket whereby the compressible blanket effectively floats on the cushion layer permitting radial deflection of the blanket in response to preloading impression pressure and circumferential displacement of the blanket relative to the cylinder in response to misfeed contact.

* * * * *